US012647695B2

(12) United States Patent (10) Patent No.: US 12,647,695 B2
Origuchi (45) Date of Patent: Jun. 2, 2026

(54) IMAGE PROCESSING DEVICE, IMAGE PROCESSING METHOD, AND IMAGE PROCESSING SYSTEM

(71) Applicant: Sony Semiconductor Solutions Corporation, Kanagawa (JP)

(72) Inventor: Yohta Origuchi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 421 days.

(21) Appl. No.: 18/546,017

(22) PCT Filed: Feb. 2, 2022

(86) PCT No.: PCT/JP2022/003975
§ 371 (c)(1),
(2) Date: Aug. 10, 2023

(87) PCT Pub. No.: WO2022/181265
PCT Pub. Date: Sep. 1, 2022

(65) Prior Publication Data
US 2024/0323561 A1 Sep. 26, 2024

(30) Foreign Application Priority Data
Feb. 26, 2021 (JP) ................................. 2021-029819

(51) Int. Cl.
*H04N 25/75* (2023.01)
*H04N 25/51* (2023.01)
(52) U.S. Cl.
CPC ............. *H04N 25/75* (2023.01); *H04N 25/51* (2023.01)

(58) Field of Classification Search
CPC ........ H04N 25/75; H04N 25/51; H04N 7/183; H04N 7/01; H04N 23/698; H04N 23/90; H04N 23/80
See application file for complete search history.

(56) References Cited

U.S. PATENT DOCUMENTS

2019/0043174 A1* 2/2019 Kurnaz ..................... G06T 5/20
2021/0337117 A1* 10/2021 Cai .......................... G06F 3/005

FOREIGN PATENT DOCUMENTS

JP      2008277879 A      11/2008
JP      2017017562 A  *  1/2017  ............. H04N 5/225
(Continued)

OTHER PUBLICATIONS

International Search Report (PCT/ISA/210), International Application No. PCT/JP2022/003975, dated Apr. 19, 2022.

*Primary Examiner* — Nhan T Tran
(74) *Attorney, Agent, or Firm* — Michael Best & Friedrich LLP

(57) ABSTRACT
An image processing device of an embodiment according to the present disclosure includes: an obtaining section (10B) that sequentially obtains images based on pixel signals respectively for a plurality of pixels which pixel signals are output from a pixel array section including the plurality of pixels; a setting section (10C) that assigns the same identification information to the plurality of images having the same imaging condition and assigns different pieces of identification information to the plurality of images having different imaging conditions; and an output section (10D) that outputs the plurality of images to which the identification information is assigned.

18 Claims, 13 Drawing Sheets

(56)     References Cited

FOREIGN PATENT DOCUMENTS

| WO | 2019092952 | A1 |   | 5/2019 | | |
| WO | WO-2020004074 | A1 | * | 1/2020 | .......... | H04N 23/741 |
| WO | 2020039992 | A1 |   | 2/2020 | | |

* cited by examiner

Figure 12:
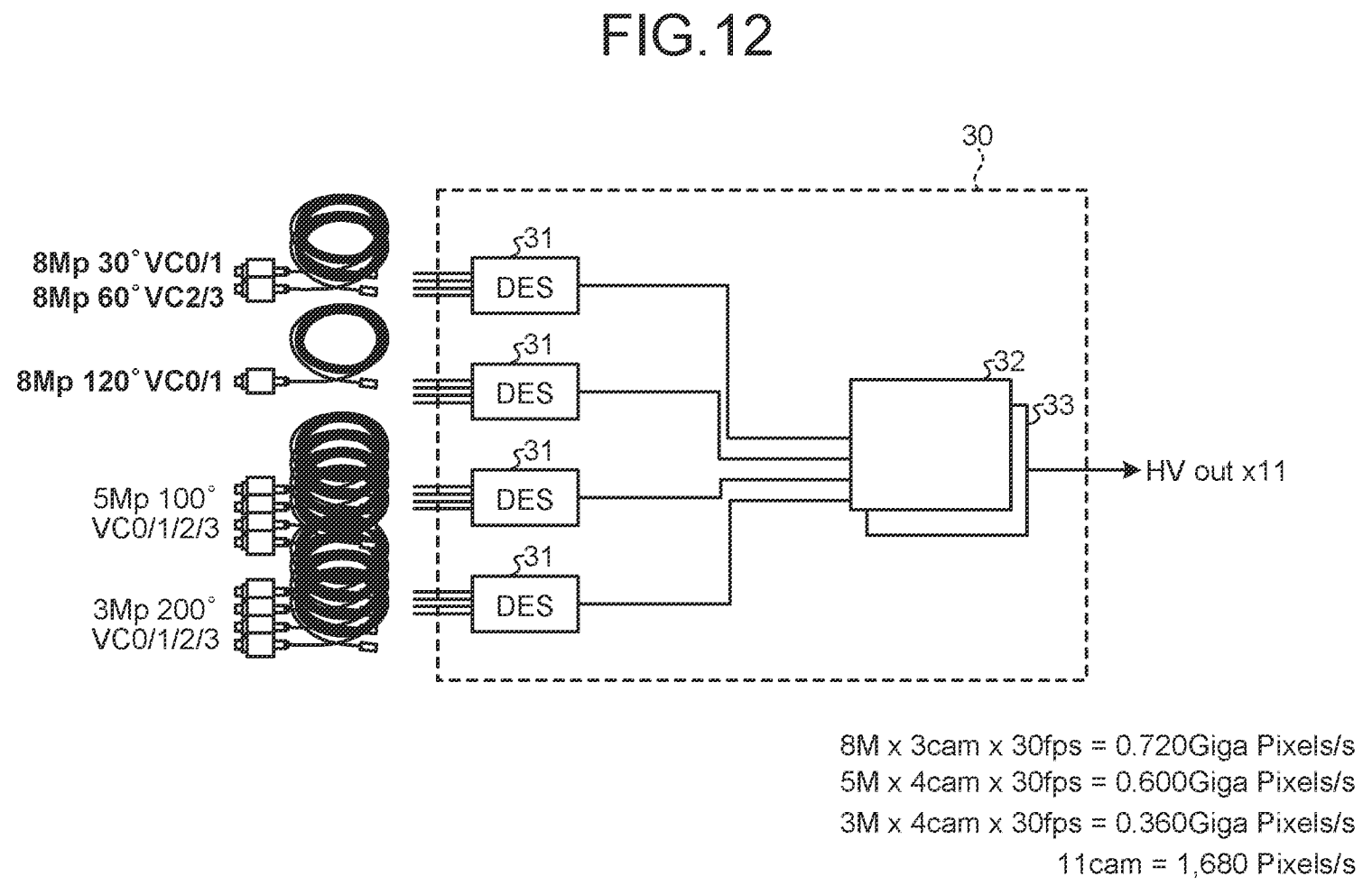

DES 31
DES 31
DES 31
DES 31

32
33

HV out x11

8M x 3cam x 30fps = 0.720Giga Pixels/s
5M x 4cam x 30fps = 0.600Giga Pixels/s
3M x 4cam x 30fps = 0.360Giga Pixels/s
11cam = 1,680 Pixels/s

30

IMAGE PROCESSING DEVICE, IMAGE PROCESSING METHOD, AND IMAGE PROCESSING SYSTEM

FIELD

The present disclosure relates to an image processing device, an image processing method, and an image processing system.

BACKGROUND

An imaging system (such as image sensor system) that outputs an image for computer vision (CV) and an image for human vision (HV) has been developed. In the image sensor system, RAW data (raw data) of an image (such as a moving image, a still image, or the like) is output from an image sensor, and the image for CV and the image for HV is generated by processing of the RAW data and are simultaneously output. For example, the image for CV is an image for sensing, and the image for HV is an image for viewing.

CITATION LIST

Patent Literature

Patent Literature 1: WO 2019/092952 A

SUMMARY

Technical Problem

However, in a case where RAW data of an image is output from an image sensor and an image for CV and an image for HV are generated from the RAW data and simultaneously output, two image sensors are necessary in order to perform optimal sensor setting for each, that is, imaging condition setting (such as exposure control of an electronic shutter speed, a gain, or the like, on/off of a mode, or the like). In this case, since it is necessary to prepare two camera modules, an installation space thereof is necessary, and a device becomes large. In addition, since the number of components increases, a cost increases.

Thus, the present disclosure proposes an image processing device, an image processing method, and an image processing system capable of controlling an increase in a size and a cost of the device.

Solution to Problem

An image processing device according to the embodiment of the present disclosure includes: an obtaining section that sequentially obtains images based on pixel signals respectively for a plurality of pixels which pixel signals are output from a pixel array section including the plurality of pixels; a setting section that assigns same identification information to the plurality of images having a same imaging condition and assigns different pieces of identification information to the plurality of images having different imaging conditions; and an output section that outputs the plurality of images to which the identification information is assigned.

An image processing method according to the embodiment of the present disclosure includes: sequentially obtaining images based on pixel signals respectively for a plurality of pixels which pixel signals are output from a pixel array section including the plurality of pixels; assigning same identification information to the plurality of images having a same imaging condition; assigning different pieces of identification information to the plurality of images having different imaging conditions; and outputting the plurality of images to which the identification information is assigned.

An image processing system according to the embodiment of the present disclosure includes: an obtaining section that sequentially obtains images based on pixel signals respectively for a plurality of pixels which pixel signals are output from a pixel array section including the plurality of pixels; a setting section that assigns same identification information to the plurality of images having a same imaging condition and assigns different pieces of identification information to the plurality of images having different imaging conditions; an output section that outputs the plurality of images to which the identification information is assigned; and a processing section that performs processing on the plurality of output images.

BRIEF DESCRIPTION OF DRAWINGS

FIG. 1 is a diagram depicting an example of a schematic configuration of an imaging system according to a first embodiment.

FIG. 12 is a first diagram for explaining proof of concept based on any one of the first to third embodiments.

DESCRIPTION OF EMBODIMENTS

Figure 2:
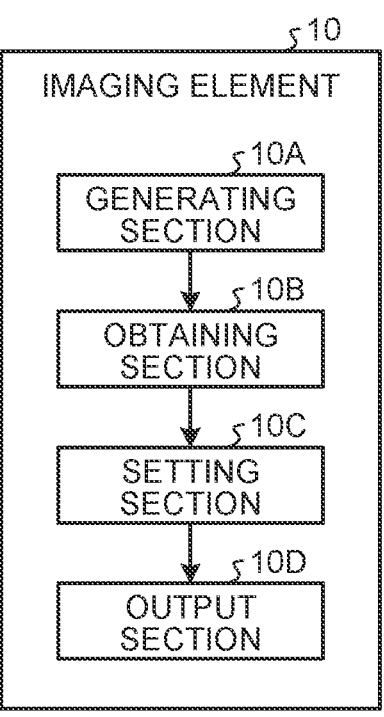
FIG. 2 is a first diagram depicting an example of a schematic configuration of an imaging element according to the first embodiment.

In the following, embodiments of the present disclosure will be described in detail on the basis of the drawings. Note that a device, a method, and a system according to the present disclosure are not limited by the embodiments. Also, in each of the following embodiments, overlapped description is omitted by assignment of the same reference sign to parts that are basically the same.

Each of one or a plurality of embodiments (including example and modification example) described in the following can be performed independently. On the other hand, at least a part of the plurality of embodiments described in the following may be appropriately combined with at least a part of the other embodiments. The plurality of embodiments may include novel features different from each other. Thus, the plurality of embodiments can contribute to solving different objects or problems, and can exhibit different effects.

The present disclosure will be described in the following order of items.

1. First embodiment
1-1. Example of a schematic configuration of an imaging system
1-2. Example of a schematic configuration of an imaging element
1-3. Example of a schematic configuration of RAW data of an image
1-4. Action/effect
2. Second embodiment
2-1. Example of a schematic configuration of an imaging system
2-2. Action/effect
3. Third embodiment
3-1. Example of a schematic configuration of an imaging system
3-2. Example of a schematic configuration of RAW data and YUV data of an image
3-3. Action/effect
4. Other embodiments
5. Application example
6. Practical example
6-1. Vehicle control system
6-2. Proof of concept (PoC)
7. Supplementary note

1. First Embodiment

1-1. Example of a Schematic Configuration of an Imaging System

Figure 1:
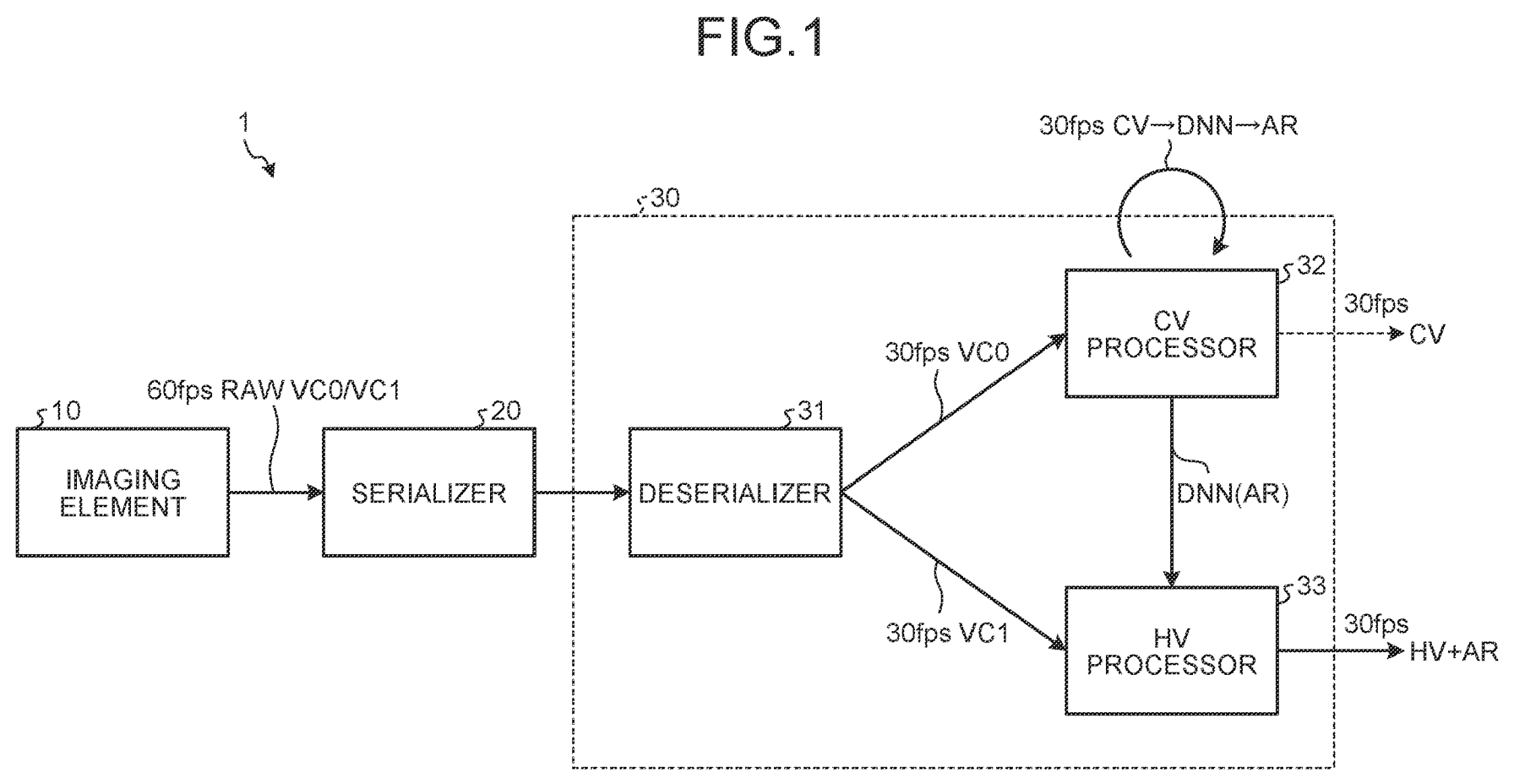

An example of a schematic configuration of an imaging system 1 according to the first embodiment will be described with reference to FIG. 1 and FIG. 2. FIG. 1 is a diagram depicting an example of a schematic configuration (configuration and processing flow) of the imaging system 1 according to the first embodiment. FIG. 2 is a diagram depicting an example of a schematic configuration (configuration and processing flow) of an imaging element 10 according to the first embodiment.

As depicted in FIG. 1, the imaging system 1 includes the imaging element 10, a serializer 20, and an image signal processing section 30. The imaging system 1 corresponds to an image processing system.

As depicted in FIG. 2, the imaging element 10 includes a generating section 10A, an obtaining section 10B, a setting section 10C, and an output section 10D. As the imaging element 10, for example, a CMOS image sensor (CIS) can be used. Note that the obtaining section 10B, the setting section 10C, and the output section 10D correspond to an image processing device.

The imaging element 10 is formed in such a manner that sensor setting for the imaging element 10, that is, an imaging condition (such as exposure control of an electronic shutter speed, a gain, or the like, on/off of a mode, or the like) for the imaging element 10 can be set according to input information from the outside. For example, an imaging condition is set in the imaging element 10 according to an operation by an operator on an input section (not depicted)

or control by a control device (not depicted). Imaging is performed on the basis of the imaging condition. The imaging condition can be changed as appropriate.

The generating section 10A generates an image signal, that is, an image (image frame) by photoelectric conversion, and outputs the image to the obtaining section 10B. Details of a structure and the like of the imaging element 10 including the generating section 10A will be described later.

The obtaining section 10B sequentially obtains the image (image frame) output from the generating section 10A, and outputs the image to the setting section 10C.

In each of images sequentially output from the obtaining section 10B, the setting section 10C assigns the same identification information to a plurality of images having the same imaging condition, assigns different pieces of identification information to a plurality of images having different imaging conditions, and performs an output thereof to the output section 10D. As the identification information, data of a virtual channel (VC) in a mobile industry processor interface (MIPI) standard can be used.

For example, the setting section 10C assigns first identification information (such as VC0) to each image in which the imaging condition is a condition for obtaining an image for computer vision (CV), and assigns second identification information (such as VC1) different from the first identification information to each image in which the imaging condition is a condition for obtaining an image for human vision (HV).

In the example of FIG. 1, VC0 and VC1 are set for RAW data (raw data) of 60 fps according to the imaging conditions. That is, with respect to the image frame of the RAW data of 60 fps, VC0 is set to the image frame in which the imaging condition is a condition for obtaining the image for CV, and VC1 is set to the image frame in which the imaging condition is a condition for obtaining the image for HV.

For example, with respect to the imaging conditions, the condition for obtaining the image for CV is a condition in which the image for CV becomes suitable for sensing (detection by a sensor), and the condition for obtaining the image for HV is a condition in which the image for HV becomes suitable for viewing (viewing by a person). As an example, the condition for obtaining the image for CV is a condition in which automatic exposure control is off, and conversely, the condition for obtaining the image for HV is a condition in which the automatic exposure control is on. That is, the imaging condition for obtaining the image for CV may be set in such a manner that the image for CV is darker than the image for HV.

Note that the setting section 10C assigns only the identification information to each image. However, this is not a limitation. For example, imaging condition information related to the imaging condition may be associated and added to each image to which the identification information is assigned. The imaging condition information corresponds to additional information added to the image.

The output section 10D outputs the plurality of images (image frames) to which the identification information is assigned as described above to the serializer 20.

The serializer 20 converts parallel data, which is data of each image output from the output section 10D, into serial data and outputs the serial data to the image signal processing section 30. For example, the image data for each frame includes identification information, additional information, and the like in addition to data of the image itself.

The image signal processing section 30 includes a deserializer 31, a CV processor (CV processing section) 32, and an HV processor (HV processing section) 33. The deserializer 31 corresponds to a distribution section.

The deserializer 31 converts the serial data, which is data of each image output from the serializer 20, into parallel data and outputs the parallel data to the CV processor 32 and the HV processor 33. At this time, the deserializer 31 determines an output destination according to the identification information assigned to the image.

For example, the deserializer 31 outputs the image (serial data) in which the identification information is the first identification information (such as VC0) to the CV processor 32, and outputs the image (serial data) in which the identification information is the second identification information (such as VC1) to the HV processor 33.

In the example of FIG. 1, RAW data of 30 fps (30 fps VC0) that is a half of the RAW data of 60 fps is output to the CV processor 32, and the RAW data of 30 fps (30 fps VC1) that is a half is output to the HV processor 33.

The CV processor 32 performs processing by using the data (such as 30 fps VC0) of each image output from the deserializer 31, and generates and outputs the image for CV. For example, the CV processor 32 obtains deep neural network (DNN) result information such as augmented reality (AR) information by DNN using the data of each image (for example, 30 fps CV→DNN→AR). Then, the CV processor 32 outputs the DNN result information (AR information) to the HV processor 33. Note that although appropriately outputting the image for CV, the CV processor 32 may not perform an output in a case where the image for CV is not required outside.

The HV processor 33 performs processing by using the data (such as 30 fps VC1) of each image output from the deserializer 31, and generates and outputs the image for HV. For example, the HV processor 33 generates the image for HV and an AR image by using the data of each image and the DNN result information, superimposes the AR image on the image for HV, and outputs the image (HV+AR).

Each of the CV processor 32 and the HV processor 33 includes, for example, a central processing unit (CPU), a graphic processing unit (GPU), or the like. As an example, the CV processor 32 and the HV processor 33 are multi-core processors. As the multi-core processors, for example, a processor equipped with a plurality of CPU cores, GPU cores, a video processor, a computer vision accelerator, and the like can be used.

Here, each of functional sections such as the obtaining section 10B, the setting section 10C, the output section 10D, and the image signal processing section 30 described above may be configured by both or one of hardware and software. Configurations of these are not specifically limited. For example, each of the functional sections may be realized by, for example, an integrated circuit such as an application specific integrated circuit (ASIC) or a field programmable gate array (FPGA). In addition, each of the functional sections may be realized when a computer such as a CPU or an MPU executes a program stored in advance in a ROM by using a RAM or the like as a work area.

Furthermore, although the obtaining section 10B, the setting section 10C, and the output section 10D are provided in the imaging element 10, this is not a limitation. For example, any or all of the obtaining section 10B, the setting section 10C, and the output section 10D may be provided in the image signal processing section 30.

1-2. Example of a Schematic Configuration of an Imaging Element

Figure 3:
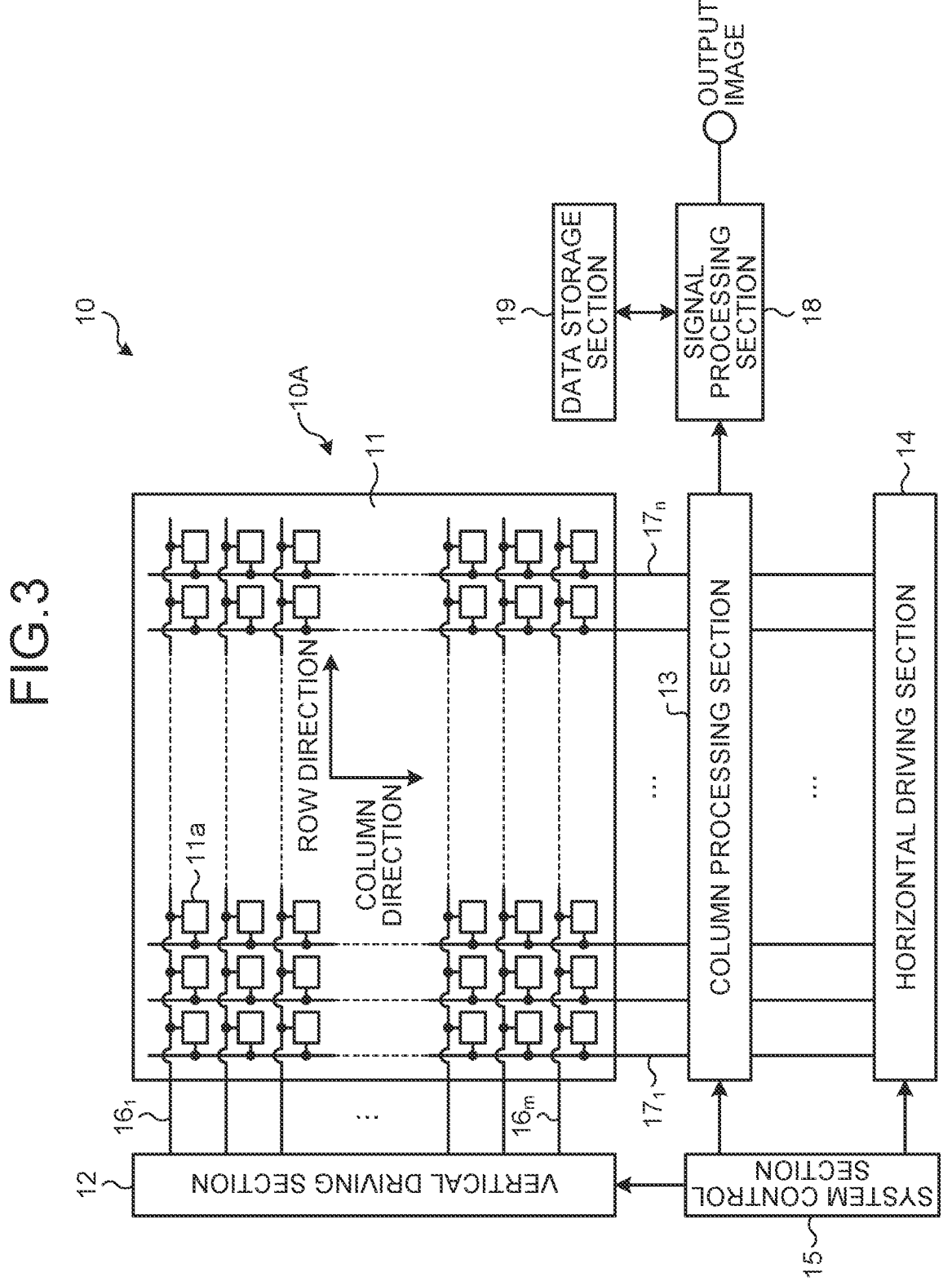
FIG. 3 is a second diagram depicting an example of the schematic configuration of the imaging element according to the first embodiment.

An example of a schematic configuration of the imaging element (solid imaging element) 10 according to the first embodiment will be described with reference to FIG. 3. FIG. 3 is a diagram depicting an example of a schematic configuration of the imaging element 10 according to the first embodiment.

As depicted in FIG. 3, the imaging element 10 includes a pixel array section 11, a vertical driving section 12, a column processing section 13, a horizontal driving section 14, and a system control section 15. Each of these sections 11 to 15 corresponds to the generating section 10A. Note that each of the sections 11 to 15 is formed on a semiconductor substrate (chip) (not depicted). The imaging element 10 is, for example, a CMOS image sensor.

The pixel array section 11 includes a plurality of pixels (unit pixels) 11a. Each of the pixels 11a generates a photoelectric charge (charge) of a charge amount corresponding to an amount of incident light and accumulates the photoelectric charge inside. These pixels 11a are two-dimensionally arranged in a matrix array. For example, each of the pixels 11a has a back-illuminated pixel structure.

Furthermore, the pixel array section 11 includes pixel driving lines 16 ($16_1$ to $16_m$) and vertical signal lines 17 ($17_1$ to $17_n$). The pixel driving lines 16 ($16_1$ to $16_m$) are formed in a horizontal direction in FIG. 1 for each row with respect to a pixel array of m rows×n columns (each of m and n is an integer of 1 or more). The vertical signal lines 17 ($17_1$ to $17_n$) are formed in a vertical direction in FIG. 3 for each column with respect to the pixel array of m rows×n columns. Note that the vertical signal lines 17 are also referred to as VSLs. One end of each of the pixel driving lines 16 is connected to an output end corresponding to each row of the vertical driving section 12.

The vertical driving section 12 includes, for example, a shift register, an address decoder, and the like. The vertical driving section 12 is a pixel driving section that drives the pixels 11a of the pixel array section 11 at the same time or in units of rows. A pixel signal output from each of the pixels 11a selectively scanned by the vertical driving section 12 is supplied to the column processing section 13 through each of the vertical signal lines 17. For example, the vertical driving section 12 has a configuration including a reading scanning system and a sweep scanning system, and can perform batch sweep or batch transfer under driving by these scanning systems. For example, in a case of a global shutter operation, a period from the batch sweep to the batch transfer is an accumulation period (exposure period).

The column processing section 13 performs predetermined signal processing on the pixel signal output from each of the pixels 11a of the selected row through the vertical signal line 17 for each pixel column of the pixel array section 11, and temporarily holds the pixel signal after the signal processing. Specifically, the column processing section 13 performs, as the signal processing, at least noise removal processing such as correlated double sampling (CDS) processing. By the correlated double sampling by the column processing section 13, a fixed pattern noise unique to a pixel, such as a reset noise or a threshold variation of an amplification transistor is removed. Note that the column processing section 13 can be provided with, for example, an analog-digital (AD) conversion function in addition to the noise removal processing, and a signal level can be output as a digital signal.

The horizontal driving section 14 includes, for example, a shift register, an address decoder, and the like. The horizontal driving section 14 sequentially selects unit circuits corresponding to the pixel columns of the column processing section 13. By the selective scanning by the horizontal driving section 14, the pixel signals on which the signal processing is performed by the column processing section 13 are sequentially output to a signal processing section 18.

The system control section 15 includes, for example, a timing generator that generates various timing signals, and the like. The system control section 15 performs driving control of the vertical driving section 12, the column processing section 13, the horizontal driving section 14, and the like on the basis of the various timing signals generated by the timing generator.

Note that the imaging element 10 includes the signal processing section 18 and a data storage section 19. The signal processing section 18 includes the obtaining section 10B, the setting section 10C, and the output section 10D described above, and outputs each of images (image frame) based on the pixel signals as the RAW data. The signal processing section 18 functions as the image processing device. For example, the signal processing section 18 has an addition processing function, and can perform various kinds of signal processing such as addition processing on the pixel signals output from the column processing section 13. In the signal processing in the signal processing section 18, the data storage section 19 temporarily stores data necessary for the processing. The signal processing section 18 and the data storage section 19 may be mounted on the same substrate as the imaging element 10, or may be realized by an external signal processing section that is provided on a substrate different from that of the imaging element 10 and that is, for example, a digital signal processor (DSP), or processing by software.

1-3. Example of a Schematic Configuration of RAW Data of an Image

Figure 4:
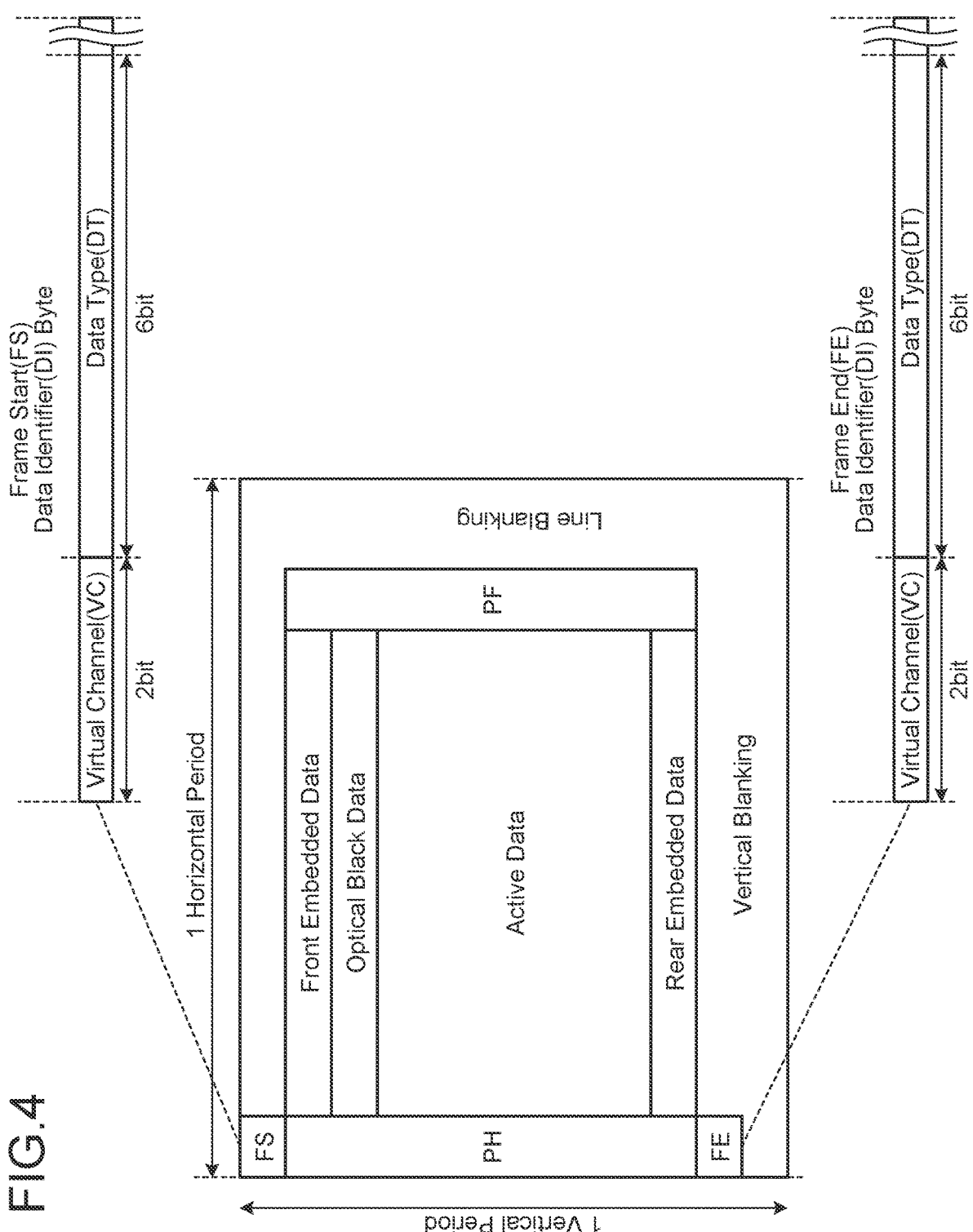
FIG. 4 is a diagram depicting an example of a schematic configuration of RAW data of an image according to the first embodiment.

An example of a schematic configuration of the RAW data of the image according to the first embodiment will be described with reference to FIG. 4. FIG. 4 is a view depicting an example of the schematic configuration of the RAW data of the image according to the first embodiment.

As depicted in FIG. 4, a format (frame format) of the RAW data of the image is a format based on the MIPI standard. The RAW data of the image is generated on the basis of this format.

Frame Start (FS) is data indicating a start of a frame. FS includes Virtual Channel (VC), Data Type (DT), and the like. Note that FS also includes Word Count (WC), Error Correcting Code (ECC), and the like (not depicted). Furthermore, Frame End (FE) is data indicating an end of the frame. Similarly to FS, FE also includes VC, DT, and the like. Note that FE also includes WC, ECC, and the like (not depicted).

VC is data indicating a VC number (such as VC0, VC1, VC2, VC3, or the like). The VC number is set according to an imaging condition. Thus, RAW data having the same VC number is data captured under the same imaging condition. In addition, DT is data indicating a DT number. The DT number is set according to a data type. Thus, RAW data having the same DT number is data of the same data type. VC and DT function as Data Identifier Byte (DIB).

Packet Header (PH) is data indicating a start of a packet. In addition, Packet Footer (PF) is data indicating an end of a packet.

Active Data (AD) is data of the RAW data itself of the image. In addition, Optical Black Data (OBD) is data of a black level in vision (black reference data). APH and APF sandwiching AD and OBD are PH and PF of AD and OBD.

Front Embedded Data (FED) is data in which additional information can be embedded. In addition, Rear Embedded Data (RED) is also data in which additional information can be embedded, similarly to the FED.

The RAW data of the image is generated on the basis of such a format, and the VC number is assigned as the identification information. As a result, it becomes possible to identify the image according to the imaging condition in processing of a subsequent stage. For example, the same VC number is assigned to the images having the same imaging condition, and different VC numbers are assigned to the images having different imaging conditions. In this case, it becomes possible to identify the images having the same imaging condition and the images having different imaging conditions.

Note that the imaging condition of when the RAW data of the image is obtained may be stored as the additional information in FED or RED of a packet area. However, in addition to storing of the imaging condition in FED or RED of the packet area, for example, the imaging condition may be stored as the additional information in a header area (header), a footer area (footer), or the like of the frame.

In addition, as a communication system, for example, the MIPI standard such as a camera serial interface 2 (CSI-2) standard is used. However, this is not a limitation. For example, other standards established by an MIPI alliance, such as a communication system conforming to an MIPI CSI-3 standard and a communication system conforming to an MIPI display serial interface (DSI) may be used, or a communication system other than the communication system according to the standard established by the MIPI alliance may be used.

1-4. Action/Effect

As described above, according to the first embodiment, the obtaining section 10B sequentially obtains the images (such as image frames) based on the pixel signals for the pixels 11a output from the pixel array section 11 including the plurality of pixels 11a, the setting section 10C assigns the same identification information to the plurality of images having the same imaging condition, and assigns different pieces of identification information to the plurality of images having different imaging conditions, and the output section 10D outputs the plurality of images to which the identification information is assigned. Thus, it becomes possible to select the images having the same imaging condition or the images having different imaging conditions on the basis of the identification information. Thus, different imaging conditions can be set in one pixel array section 11, that is, one imaging element 10, and it is not necessary to provide a plurality of imaging elements (such as image sensor) to set different imaging conditions. As a result, it is possible to control an installation space and the number of components, and thus, it is possible to control an increase in a size and a cost of the device. In addition, in a case where the DNN result by the image for CV is superimposed as the AR image on the image for HV, it is possible to control deterioration in performance due to an influence of an angle difference, a component individual difference, or the like.

In addition, the identification information may be data of Virtual Channel (VC) in the mobile industry processor interface (MIPI) standard. As a result, the identification information can be easily obtained, and a processing speed can be improved.

In addition, the setting section 10C may assign first identification information (such as VC0) to a plurality of images in which the imaging condition is the condition for obtaining the image for CV, and may assign second identification information (such as VC1) different from the first identification information to a plurality of images in which the imaging condition is the condition for obtaining the image for HV. As a result, since it becomes possible to set different imaging conditions for the image for CV and the image for HV, it is possible to set the imaging condition suitable for each.

In addition, the condition for obtaining the image for CV is a condition that the image for CV becomes an image suitable for sensing that is detection by the sensor, and the condition for obtaining the image for HV is a condition that the image for HV becomes an image suitable for viewing that is viewed by a person. Since this makes it possible to set the imaging conditions respectively suitable for the image for CV and the image for HV, it is possible to improve detection accuracy of the sensor based on the image for CV and to improve visibility based on the image for HV.

In addition, the condition for obtaining the image for CV may be a condition in which the automatic exposure control for automatically controlling exposure related to imaging is off, and the condition for obtaining the image for HV may be a condition in which the automatic exposure control is on. Since this makes it possible to set the imaging conditions respectively suitable for the image for CV and the image for HV, it is possible to improve detection accuracy of the sensor based on the image for CV and to improve visibility based on the image for HV.

In addition, the condition for obtaining the image for CV may be a condition that the image for CV is darker than the image for HV. As a result, since it is possible to set the imaging condition suitable for the image for CV, the detection accuracy of the sensor based on the image for CV can be improved.

Furthermore, the setting section 10C may associate the imaging condition information related to the imaging condition with each of the plurality of images to which the identification information is assigned, and the output section 10D may output the plurality of pieces of imaging condition information together with the plurality of images to which the identification information is assigned. As a result, since the imaging condition can be easily known from the imaging condition information in the processing in the subsequent stage, the processing speed can be improved.

Furthermore, the setting section 10C may respectively add a plurality of pieces of the imaging condition information as additional information to the plurality of images to which the identification information is assigned. As a result, since the imaging condition information becomes the additional information of the images, the imaging condition information can be easily obtained in the processing in the subsequent stage, and the processing speed can be improved.

Furthermore, each of the plurality of pieces of imaging condition information may be data of Embedded Data (ED) in the mobile industry processor interface (MIPI) standard. As a result, the imaging condition information can be easily obtained, and the processing speed can be improved.

In addition, processors such as the CV processor 32 and the HV processor 33 (examples of a processing section) may execute processing on the plurality of output images according to the identification information. As a result, since the processing can be changed for each piece of the identification information, that is, each of the imaging conditions, the processing suitable for each of the imaging conditions can be performed.

In addition, the processors such as the CV processor 32 and the HV processor 33 may execute the same processing on the plurality of images having the same identification information, and execute different kinds of processing on the plurality of images having different pieces of identification information. As a result, processing suitable for each piece of the identification information, that is, each of the imaging conditions can be performed according to the identification information.

Furthermore, the plurality of processors such as the CV processor 32 and the HV processor 33 is provided, and a deserializer 31 (example of a distribution section) that distributes the plurality of output images to the plurality of processors according to the identification information is further included. As a result, since the processor can be changed for each piece of the identification information, that is, each of the imaging conditions, the processors respectively suitable for the imaging conditions can be used.

In addition, the deserializer 31 sends the plurality of images having the same identification information to the same processor, and sends the plurality of images having the different pieces of identification information to the different processors. As a result, the processor suitable for each piece of the identification information, that is, each of the imaging conditions can be used according to the identification information.

2. Second Embodiment

2-1. Example of a Schematic Configuration of an Imaging System

Figure 5:
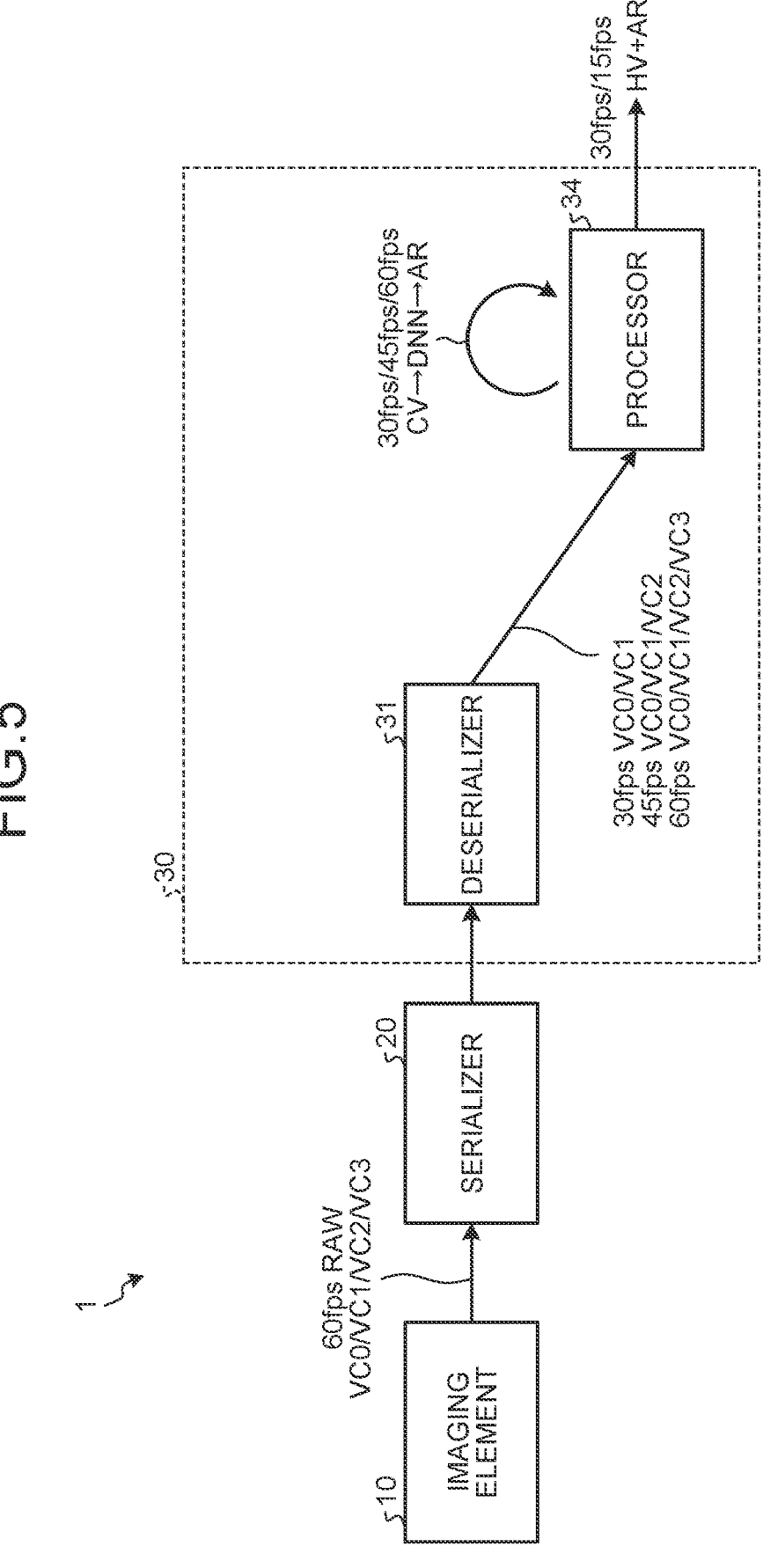
FIG. 5 is a diagram depicting an example of a schematic configuration of an imaging system according to a second embodiment.

An example of a schematic configuration of an imaging system 1 according to the second embodiment will be described with reference to FIG. 5. FIG. 5 is a diagram depicting an example of the schematic configuration (configuration and processing flow) of the imaging system 1 according to the second embodiment.

As depicted in FIG. 5, an image signal processing section 30 includes a processor 34 instead of the CV processor 32 and the HV processor 33 according to the first embodiment. The processor 34 functions as the CV processor 32 and the HV processor 33 according to the first embodiment.

For example, an imaging element 10 (setting section 10C) assigns first identification information (such as VC0) to each image in which an imaging condition is a first condition, assigns second identification information (such as VC1) different from other identification information to each image in which an imaging condition is a second condition, assigns third identification information (such as VC2) different from other identification information to each image in which an imaging condition is a third condition, and assigns fourth identification information (such as VC3) different from other identification information to each image in which an imaging condition is the second condition.

In the example of FIG. 5, VC0, VC1, VC2, and VC3 are set for RAW data of 60 fps according to imaging conditions. That is, for image frames of the RAW data of 60 fps, VC0 is set for an image frame in which the imaging condition is the first condition, VC1 is set for an image frame in which the imaging condition is the second condition, VC2 is set for an image frame in which the imaging condition is the third condition, and VC3 is set for an image frame in which the imaging condition is a fourth condition. The first to fourth conditions are different from each other. For example, VC0 is low illuminance setting for CV, VC1 is backlight setting for CV, VC2 is LFM setting for CV, and VC3 is total illuminance setting for HV.

A deserializer 31 converts serial data, which is data of each image output from a serializer 20, into parallel data and outputs the parallel data to the processor 34. At this time, the deserializer 31 determines an image to be output (output image) according to identification information assigned to the image.

For example, the deserializer 31 outputs each image in which the identification information is the first identification information (such as VC0) and each image in which the identification information is the second identification information (such as VC1) to the processor 34 according to a request or a processing capacity of the processor 34. Furthermore, the deserializer 31 outputs, in addition to these images, each image in which the identification information is the third identification information (such as VC2) to the processor 34, and further outputs, in addition to these images, an image in which the identification information is the third identification information (such as VC3).

In the example of FIG. 5, there are a case where RAW data of 30 fps (30 fps VC0/VC1) that is a half of the RAW data of 60 fps is output to the processor 34, a case where RAW data of 45 fps (45 fps VC0/VC1/VC2) that is ¾ is output to the processor 34, and a case where the entire RAW data of 60 fps (60 fps VC0/VC1/VC2/VC3) is output to the processor 34.

The processor 34 performs processing by using the data (such as 30 fps, 45 fps, or 60 fps) of each image output from the deserializer 31, and obtains DNN result information (AR information) by DNN (for example, 30 fps/45 fps/60 fps CV→DNN→AR). Furthermore, the processor 34 generates an image for HV and an AR image by using the data of each image and the DNN result information, superimposes the AR image on the image for HV, and performs an output thereof (30 fps/15 fps HV+AR).

2-2. Action/Effect

As described above, according to the second embodiment, effects can be obtained similarly to the first embodiment. That is, even with the configuration as in the second embodiment, it is possible to control an increase in a size and a cost of a device.

3. Third Embodiment

3-1. Example of a Schematic Configuration of an Imaging System

Figure 6:
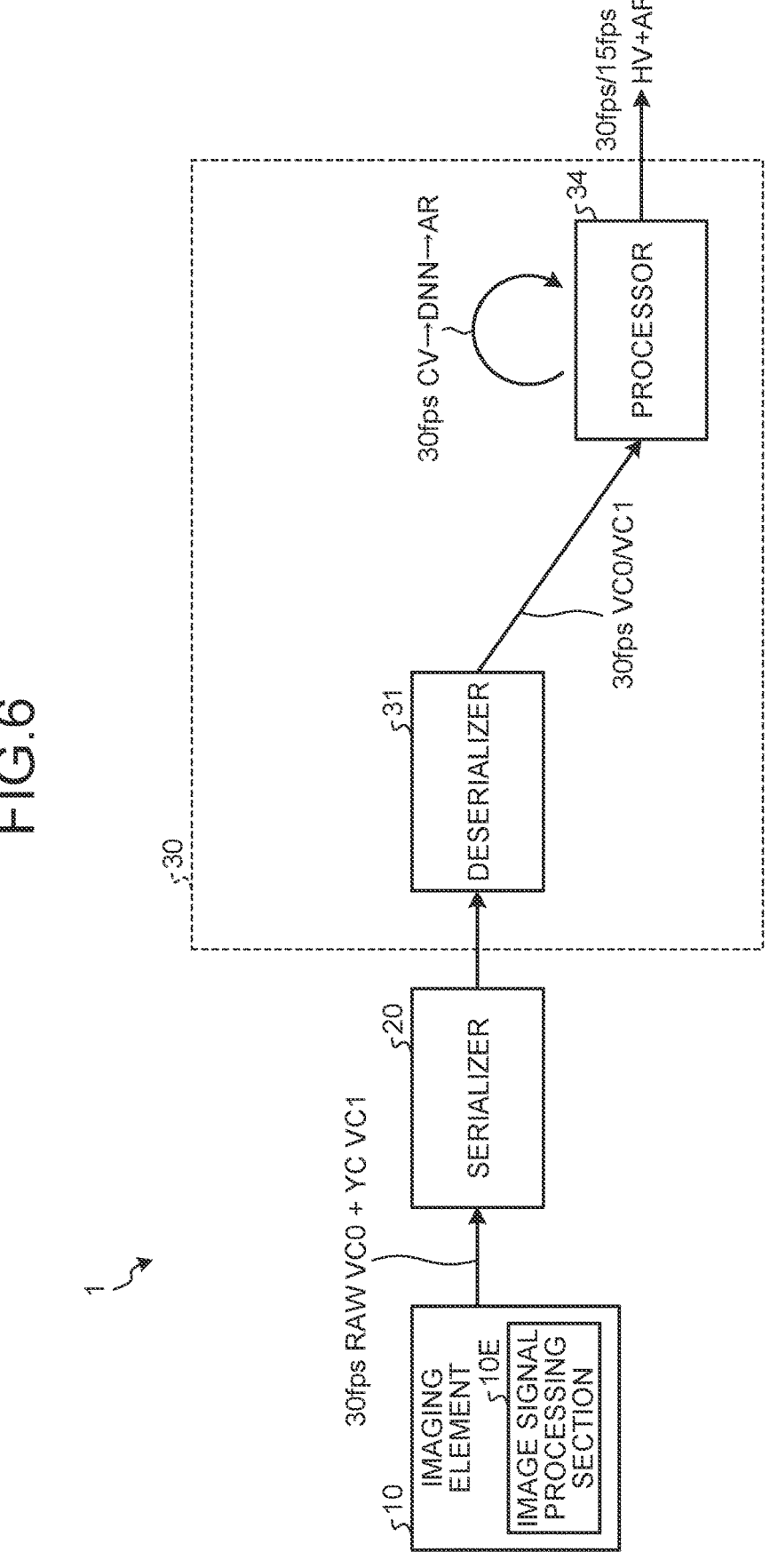
FIG. 6 is a diagram depicting an example of a schematic configuration of an imaging system according to a third embodiment.

An example of a schematic configuration of an imaging system 1 according to the third embodiment will be described with reference to FIG. 6. FIG. 6 is a diagram depicting an example of a schematic configuration (configuration and processing flow) of the imaging system 1 according to the third embodiment.

As depicted in FIG. 6, an imaging element 10 includes an image signal processing section 10E. The image signal processing section 10E generates a high dynamic range (HDR) image. The HDR image includes a plurality of images having different exposures. As the image signal processing section 10E, for example, a 24-bit processor can be used.

Furthermore, the image signal processing section 10E may process RAW data of an image by a gradation compression function (PWL), or may generate RAW data (RGB data) of an image as YUV data, for example. The YUV data is data representing color information by a combination of a luminance signal (Y), a difference (U) between the luminance signal and a blue component, and a difference (V) between the luminance signal and a red component.

An image signal processing section 30 includes a processor 34 instead of the CV processor 32 and the HV processor 33 according to the first embodiment. The processor 34 functions as the CV processor 32 and the HV processor 33 according to the first embodiment. As the processor 34, for example, a processor of 20 bits, 14 bits, or the like can be used, and the number of bits may be different from that of the image signal processing section 10E.

For example, the imaging element 10 (setting section 10C) assigns first identification information (such as VC0) to each image in which an imaging condition is a first condition, and assigns second identification information (such as VC1) different from other identification information to each image in which the imaging condition is a second condition.

In the example of FIG. 6, VC0 and VC1 are set according to the imaging conditions for RAW data (RAW) and YUV data (YC: luminance and color) of 30 fps. That is, with respect to image frames of the RAW data and the YUV data of 30 fps, VC0 is set for the image frame in which the imaging condition is the first condition, and VC1 is set for the image frame in which the imaging condition is the second condition. The first and second conditions are different from each other. For example, the first condition is set in such a manner that an image is darker than that in the second condition.

A deserializer 31 converts serial data, which is data of each image output from a serializer 20, into parallel data and outputs the parallel data to the processor 34. At this time, the deserializer 31 determines an image to be output (output image) according to identification information assigned to the image.

For example, the deserializer 31 outputs each image in which the identification information is the first identification information (such as VC0) and each image in which the identification information is the second identification information (such as VC1) to the processor 34 according to a request or a processing capacity of the processor 34.

In the example of FIG. 6, the RAW data and the YUV data of 30 fps (30 fps VC0/VC1) are output to the processor 34. Note that only one of the RAW data and the YUV data may be output.

The processor 34 performs processing by using the data (for example, 30 fps) of each image output from the deserializer 31, and obtains DNN result information (AR information) by DNN (for example, 30 fps CV→DNN→AR). Furthermore, the processor 34 generates an image for HV and an AR image by using the data of each image and the DNN result information, superimposes the AR image on the image for HV, and performs an output thereof (30 fps HV+AR). For example, in a case where data of 45 fps in data of 60 fps is used for CV in the processor 34, data of 15 fps is for HV (15 fps HV+AR).

Figure 7:
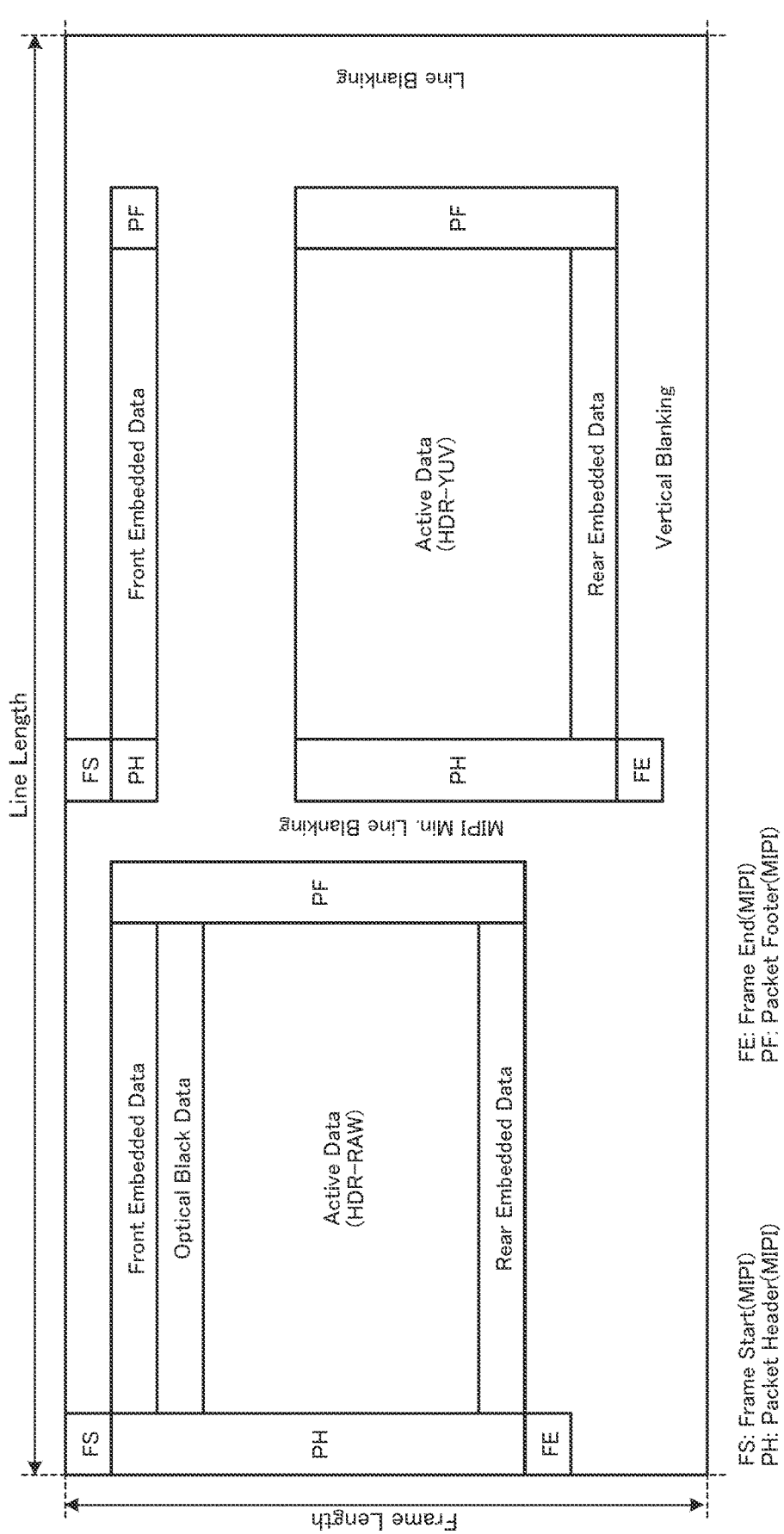
FIG. 7 is a diagram depicting an example of a schematic configuration of RAW data and YUV data of an image according to the third embodiment.

3-2. Example of a Schematic Configuration of RAW Data and YUV Data of an Image An example of a schematic configuration of the RAW data and the YUV data of the image according to the third embodiment will be described with reference to FIG. 7. FIG. 7 is a view depicting an example of the schematic configuration of the RAW data and the YUV data of the image according to the third embodiment.

As depicted in FIG. 7, a format (frame format) of the RAW data and the YUV data of the image is a format based on an MIPI standard. The RAW data and the YUV data of the image are generated on the basis of this format.

Both the format of the RAW data and the format of the YUV data of the image are basically similar to the format depicted in FIG. 4. However, RAW data of HDR (HDR-RAW) is stored in AD in the format of the RAW data of the image. YUV data of HDR (HDR-YUV) is stored in AD in the format of the YUV data.

3-3. Action/Effect

As described above, according to the third embodiment, effects can be obtained similarly to the first embodiment. That is, even with the configuration as in the third embodiment, it is possible to control an increase in a size and a cost of the device.

4. Other Embodiments

The processing according to the above-described embodiments (or modification examples) may be performed in various different forms (modification examples) other than the above-described embodiments. For example, among the pieces of processing described in the above embodiments, a whole or part of the processing described to be automatically performed can be manually performed, or a whole or part of the processing described to be manually performed can be automatically performed by a known method. In addition, the processing procedures, specific names, and information including various kinds of data or parameters described in the above document or in the drawings can be arbitrarily changed unless otherwise specified. For example, various kinds of information depicted in each drawing are not limited to the depicted information.

Also, each component of each of the depicted devices is a functional concept, and does not need to be physically configured in the depicted manner. That is, a specific form of distribution/integration of each device is not limited to what is depicted in the drawings, and a whole or part thereof can be functionally or physically distributed/integrated in an arbitrary unit according to various loads and usage conditions.

Also, the above-described embodiments (or modification examples) can be arbitrarily combined in a range in which the processing contents do not contradict with each other. Also, the effect described in the present description is merely an example and is not a limitation, and there may be another effect.

5. Application Example

The imaging element 10 according to the above embodiments (or modification examples) is applied to an imaging device. The imaging device is, for example, an electronic device such as a digital still camera, a video camera, a smartphone, a tablet terminal, a mobile phone, a personal digital assistant (PDA), or a notebook personal computer (PC).

Figure 8:
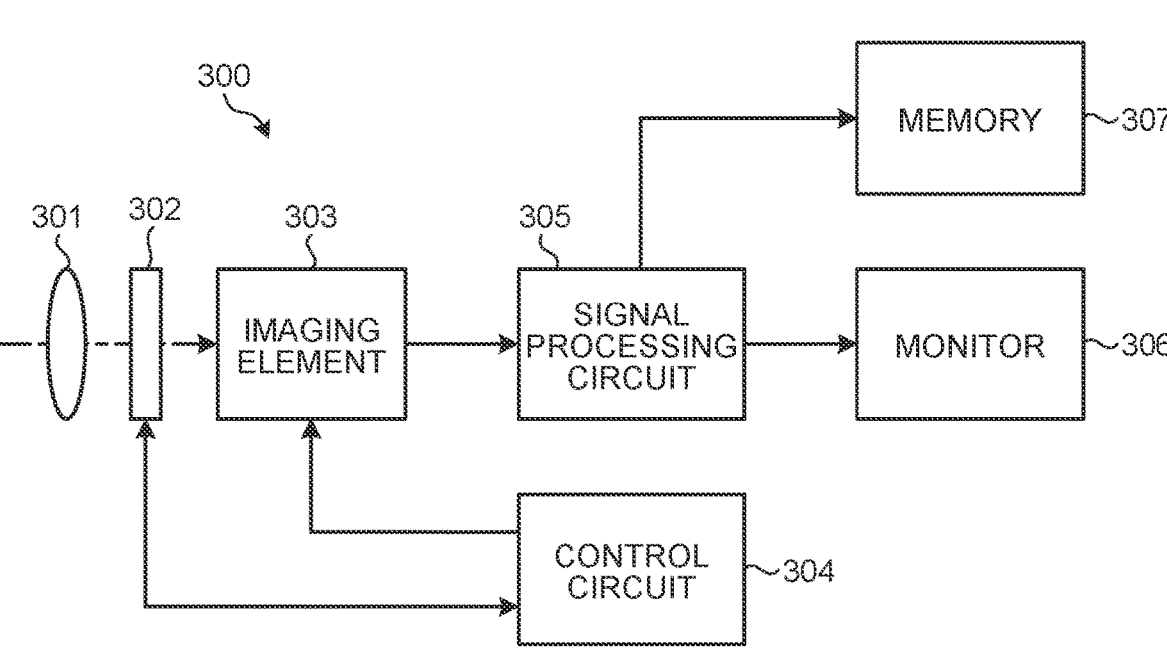
FIG. 8 is a diagram depicting an example of a schematic configuration of an imaging device.

An example of an imaging device 300 will be described with reference to FIG. 8. FIG. 8 is a block diagram depicting an example of a schematic configuration of the imaging device 300 as an electronic device to which the present technology is applied.

As depicted in FIG. 8, the imaging device 300 includes an optical system 301, a shutter device 302, an imaging element 303, a control circuit (driving circuit) 304, a signal processing circuit 305, a monitor 306, and a memory 307. The imaging device 300 can capture a still image and a moving image. The imaging element 303 is any of the imaging elements 10 according to the above-described embodiments (or modification examples). The signal processing circuit 305 includes a serializer 20, an image signal processing section 30, and the like.

The optical system 301 includes one or a plurality of lenses. The optical system 301 guides light (incident light) from a subject to the imaging element 303 and forms an image on a light receiving surface of the imaging element 303.

The shutter device 302 is arranged between the optical system 301 and the imaging element 303. The shutter device 302 controls a light irradiation period and a light blocking period with respect to the imaging element 303 according to control by the control circuit 304.

The imaging element 303 accumulates signal charges for a certain period according to light an image of which is formed on the light receiving surface via the optical system 301 and the shutter device 302. The signal charges accumulated in the imaging element 303 are transferred in accordance with a driving signal (timing signal) supplied from the control circuit 304.

The control circuit 304 outputs a driving signal that controls transfer operation of the imaging element 303 and shutter operation of the shutter device 302 and drives the imaging element 303 and the shutter device 302.

For example, the control circuit 304 sets an imaging condition for the imaging element 303 according to an operation by an operator on an input section (not depicted). The imaging element 303 performs imaging on the basis of the set imaging condition. The imaging condition can be changed as appropriate. Note that the imaging condition may be stored by the memory 307.

The signal processing circuit 305 performs various kinds of signal processing on the signal charges output from the imaging element 303. An image (image data) obtained by performance of the signal processing by the signal processing circuit 305 is supplied to the monitor 306, or supplied to the memory 307.

The monitor 306 displays a moving image or a still image captured by the imaging element 303 on the basis of the image data supplied from the signal processing circuit 305. As the monitor 306, for example, a panel type display device such as a liquid crystal panel or an organic electro luminescence (EL) panel is used.

The memory 307 stores the image data supplied from the signal processing circuit 305, that is, image data of the moving image or the still image captured by the imaging element 303. As the memory 307, for example, a recording medium such as a semiconductor memory or a hard disk is used.

Also in the imaging device 300 configured as described above, by using any of the above-described imaging elements 10 as the imaging element 303, it is possible to control an increase in a size and a cost of the device.

6. Practical Example

A technology according to the present disclosure can be applied to various products. For example, the technology according to the present disclosure may be realized as a device mounted on any type of mobile bodies such as an automobile, an electric vehicle, a hybrid electric vehicle, a motorcycle, a bicycle, a personal mobility, an airplane, a drone, a ship, a robot, a construction machine, and an agricultural machine (tractor). Furthermore, for example, the technology according to the present disclosure may be applied to an endoscopic surgical system, a microscopic surgical system, or the like.

6-1. Vehicle Control System

Figure 9:
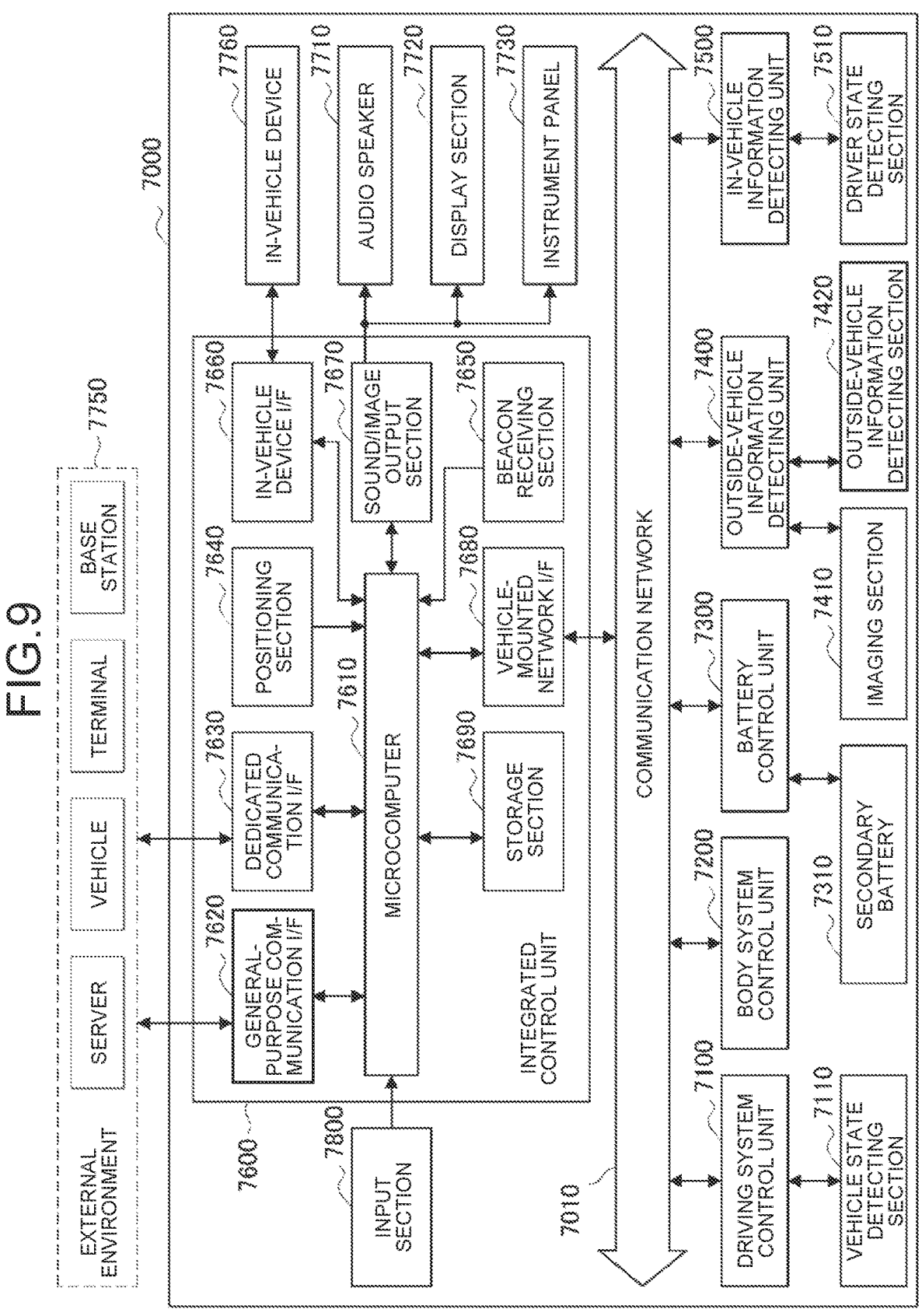
FIG. 9 is a block diagram depicting an example of schematic configuration of a vehicle control system.

FIG. 9 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 9, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 9 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 10:
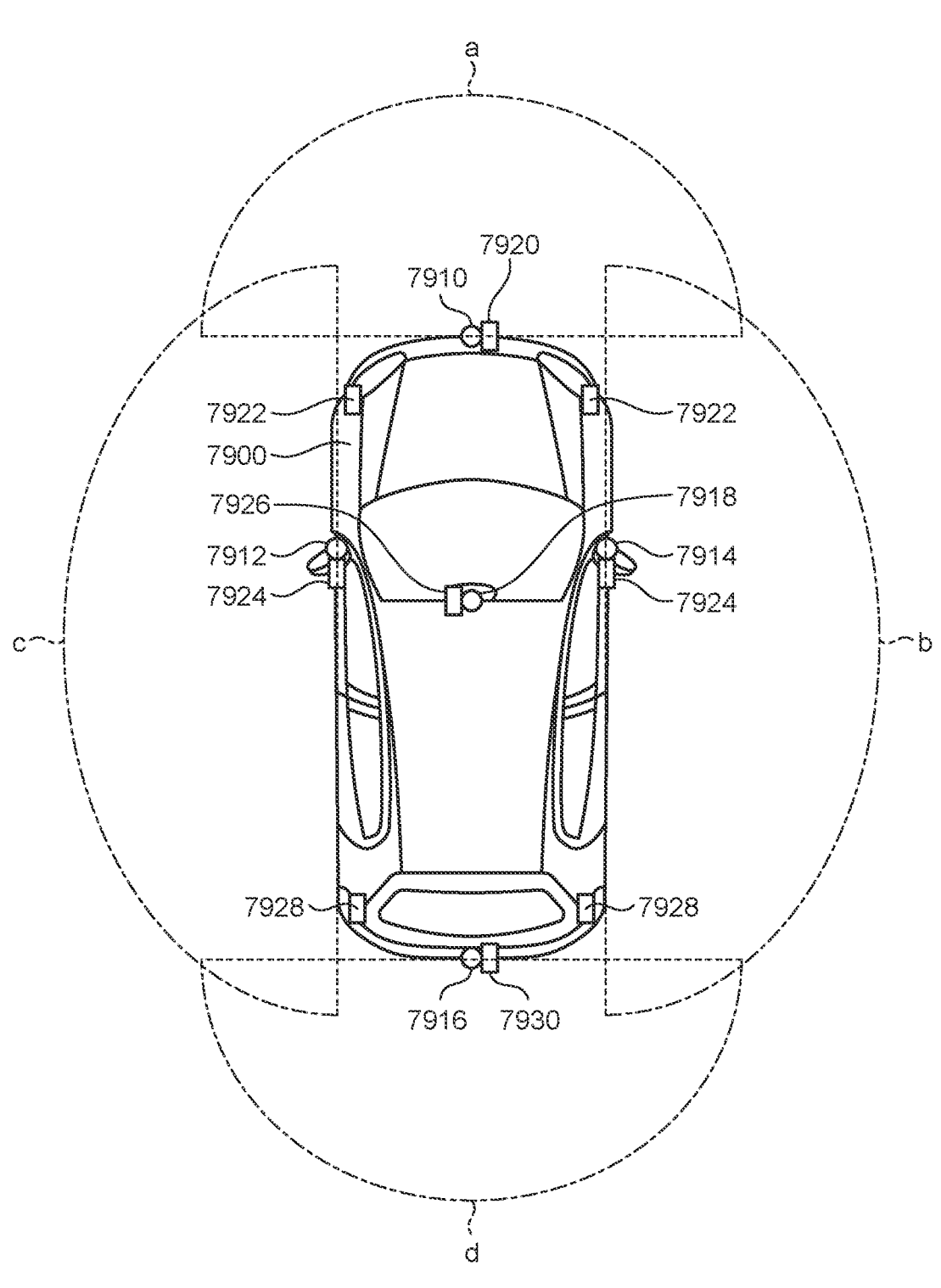
FIG. 10 is a diagram of assistance in explaining an example of installation positions of an outside-vehicle information detecting section and an imaging section.

FIG. 10 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 10 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 9, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 9, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 9 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing each function of the imaging device 300 according to the application example described with reference to FIG. 8 can be mounted on any of the control units or the like. Furthermore, it is also possible to provide a computer-readable recording medium that stores such a computer program. The recording medium is, for example, a magnetic disk, an optical disk, a magneto-optical disk, a flash memory, or the like. Furthermore, the computer program described above may be distributed via, for example, a network without utilization of the recording medium.

In the vehicle control system 7000 described above, the imaging device 300 according to the application example described with reference to FIG. 8 can be applied to the integrated control unit 7600 of the practical example depicted in FIG. 9. For example, the control circuit 304, the signal processing circuit 305, and the memory 307 of the imaging device 300 may be realized by the microcomputer 7610 or the storage section 7690 of the integrated control unit 7600. Furthermore, the imaging device 300 according to the application example described with reference to FIG. 8 and the imaging element 10 according to each embodiment described with reference to FIG. 1 and the like can be applied to the imaging section 7410 and the outside-vehicle information detecting section 7420 of the practical example depicted in FIG. 9, such as the imaging sections 7910, 7912, 7914, 7916, and 7918, the outside-vehicle information detecting sections 7920 to 7930, and the like of the practical example depicted in FIG. 10. Also in the vehicle control system 7000, it is possible to control an increase in a size and a cost of a device by using any of the above-described imaging elements 10.

Furthermore, at least some components of the imaging device 300 according to the application example described with reference to FIG. 8 may be realized in a module (such as an integrated circuit module including one die) for the integrated control unit 7600 of the practical example depicted in FIG. 9. Alternatively, a part of the imaging device 300 according to the application example described with reference to FIG. 8 may be realized by the plurality of control units of the vehicle control system 7000 depicted in FIG. 9.

6-2. Proof of Concept (PoC)

Figure 11:
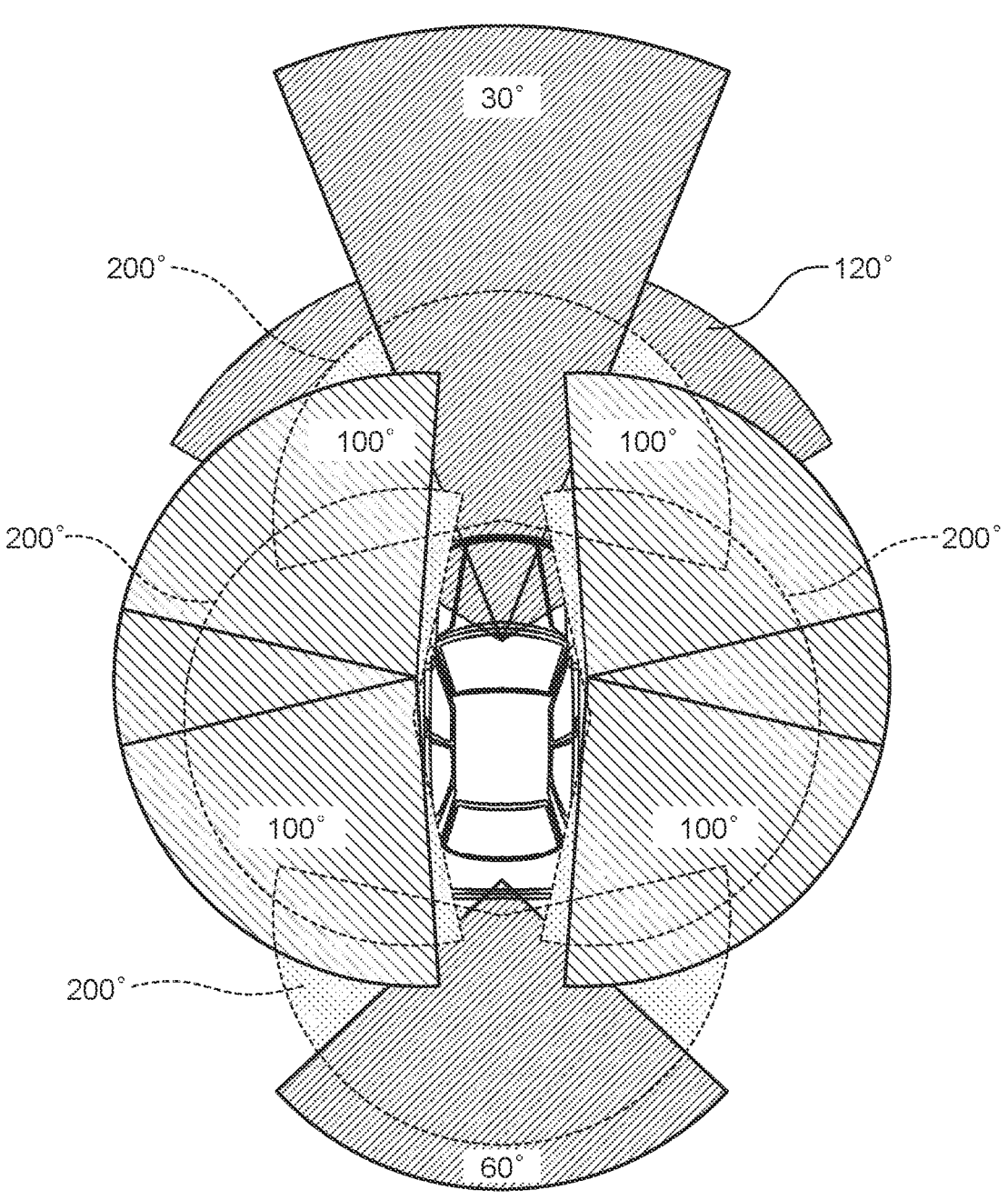
FIG. 11 is a diagram depicting an example of a photographing range of each of a plurality of cameras.
Figure 13:
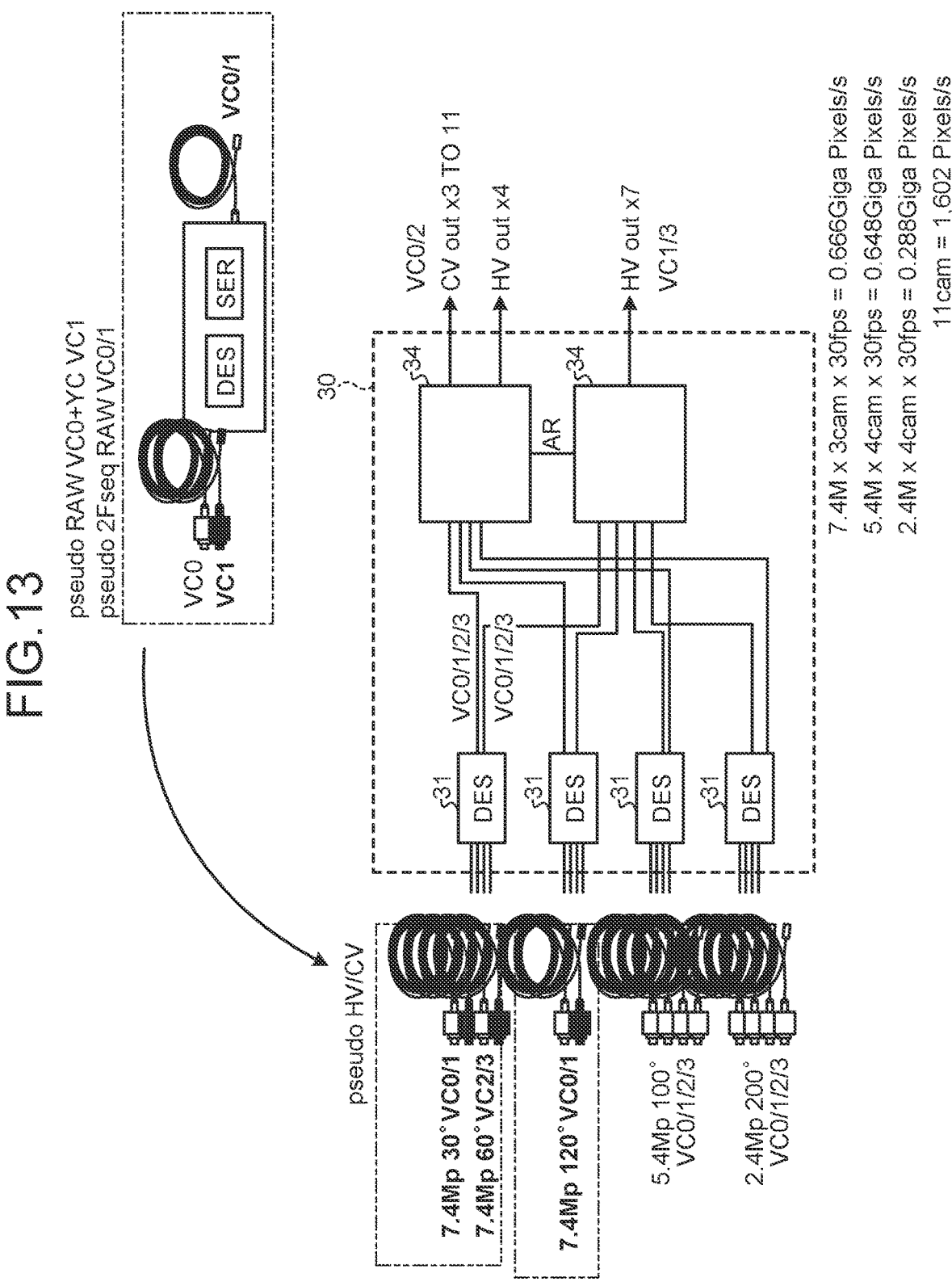
FIG. 13 is a second diagram for explaining proof-of-concept based on any one of the first to third embodiments.

Proof of concept (PoC) based on any one of the first to third embodiments will be described with reference to FIG. 11 to FIG. 13. FIG. 11 is a diagram depicting an example of a photographing range of each of a plurality of cameras. FIG. 12 and FIG. 13 are diagrams for explaining proof of concept based on any one of the first to third embodiments.

As depicted in FIG. 11 and FIG. 12, one camera of 30° (8 Mp), one camera of 60° (8 Mp), one camera of 120° (8 Mp), four cameras of 100° (5 Mp), and four cameras of 200° (3 Mp) are provided. These angles respectively indicate imaging ranges of the cameras.

According to the configuration depicted in FIG. 12, $$8 \text{ M} \times 3 \text{ cam} \times 30 \text{ fps} = 0.720 \text{ Giga Pixels/s},$$

$$5 \text{ M} \times 4 \text{ cam} \times 30 \text{ fps} = 0.600 \text{ Giga Pixels/s},$$

$$3 \text{ M} \times 4 \text{ cam} \times 30 \text{ fps} = 0.360 \text{ Giga Pixels/s, and}$$

$$11 \text{ cam} = 1.680 \text{ Giga Pixels/s}.$$

Here, as a processor that realizes the imaging system depicted in FIG. 12, when a specification of an image signal processor (ISP) is, for example, 1 Giga Pixel/s, two ISPs are required ($1 \times 2 = 2$ Giga Pixels/s). As a result, it is possible to realize the imaging system as depicted in FIG. 12 by designing to prepare the two ISPs having the above specification.

According to the configuration depicted in FIG. 13, $$7.4 \text{ M} \times 3 \text{ cam} \times 30 \text{ fps} = 0.666 \text{ Giga Pixels/s},$$

$$5.4 \text{ M} \times 4 \text{ cam} \times 30 \text{ fps} = 0.648 \text{ Giga Pixels/s},$$

$$2.4 \text{ M} \times 4 \text{ cam} \times 30 \text{ fps} = 0.288 \text{ Giga Pixels/s, and}$$

$$11 \text{ cam} = 1.602 \text{ Giga Pixels/s}.$$

Note that in the example of FIG. 13, RAW data and YUV data of an image are obtained in a pseudo manner by a simple circuit (such as DES, SER, or the like) depicted in FIG. 13.

Here, as a processor that realizes the imaging system depicted in FIG. 13, when a specification of an ISP is, for example, 1 Giga Pixel/s, two ISPs are required ($1 \times 2 = 2$ Giga Pixels/s). As a result, it is possible to realize the imaging system as depicted in FIG. 13 by designing to prepare the two ISPs having the above specification.

That is, it is possible to realize the imaging system of

HV out×4 (VC0/2 is for CV and does not go through the ISP), 5.4 M×4 cam×30 fps=0.648 Giga Pixels/s, HV out×7 (VC1/3 is for HV and goes through the ISP), 7.4 M×3 cam×30 fps=0.666 Giga Pixels/s, and 2.4 M×4 cam×30 fps=0.288 Giga Pixels/s.

7. Supplementary Note

Note that the present technology can also have the following configurations.

(1)

An image processing device comprising:

an obtaining section that sequentially obtains images based on pixel signals respectively for a plurality of pixels which pixel signals are output from a pixel array section including the plurality of pixels;

a setting section that assigns same identification information to the plurality of images having a same imaging condition and assigns different pieces of identification information to the plurality of images having different imaging conditions; and an output section that outputs the plurality of images to which the identification information is assigned.

(2)

The image processing device according to (1), wherein the identification information is data of Virtual Channel (VC) in a mobile industry processor interface (MIPI) standard.

(3)

The image processing device according to (1) or (2), wherein the setting section assigns first identification information to the plurality of images in which the imaging condition is a condition for obtaining an image for computer vision, and assigns second identification information different from the first identification information to the plurality of images in which the imaging condition is a condition for obtaining an image for human vision.

(4)

The image processing device according to (3), wherein the condition for obtaining the image for computer vision is a condition that the image for computer vision becomes an image suitable for sensing that is detection by a sensor, and the condition for obtaining the image for human vision is a condition that the image for human vision becomes an image suitable for viewing that is viewing by a person.

(5)

The image processing device according to (3), wherein the condition for obtaining the image for computer vision is a condition that automatic exposure control for automatically controlling exposure related to imaging is off, and the condition for obtaining the image for human vision is a condition that the automatic exposure control is on.

(6)

The image processing device according to (3), wherein the condition for obtaining the image for computer vision is a condition that the image for computer vision is darker than the image for human vision.

(7)

The image processing device according to any one of (1) to (6), wherein the setting section associates imaging condition information related to the imaging condition with each of the plurality of images to which the identification information is assigned, and the output section outputs a plurality of pieces of the imaging condition information together with the plurality of images to which the identification information is assigned.

(8)

The image processing device according to (7), wherein the setting section respectively adds the plurality of pieces of imaging condition information as additional information to the plurality of images to which the identification information is assigned.

(9)

The image processing device according to (7) or (8), wherein each of the plurality of pieces of imaging condition information is data of Embedded Date (ED) in a mobile industry processor interface (MIPI) standard.

(10)

An image processing method comprising:

sequentially obtaining images based on pixel signals respectively for a plurality of pixels which pixel signals are output from a pixel array section including the plurality of pixels;

assigning same identification information to the plurality of images having a same imaging condition;

assigning different pieces of identification information to the plurality of images having different imaging conditions; and outputting the plurality of images to which the identification information is assigned.

(11)

An image processing system comprising:

an obtaining section that sequentially obtains images based on pixel signals respectively for a plurality of pixels which pixel signals are output from a pixel array section including the plurality of pixels;

a setting section that assigns same identification information to the plurality of images having a same imaging condition and assigns different pieces of identification information to the plurality of images having different imaging conditions;

an output section that outputs the plurality of images to which the identification information is assigned; and a processing section that performs processing on the plurality of output images.

(12)

The image processing system according to (11), wherein the processing section performs the processing on the plurality of output images according to the identification information.

(13)

The image processing system according to (12), wherein the processing section performs the same processing on the plurality of images having the same identification information, and performs different kinds of the processing on the plurality of images having the different pieces of identification information.

(14)

The image processing system according to any one of (11) to (13), wherein a plurality of the processing sections is provided, and a distribution section that distributes the plurality of output images to the plurality of processing sections according to the identification information is further included.

(15)

The image processing system according to (14), wherein the distribution section sends the plurality of images having the same identification information to the same processing section, and sends the plurality of images having the different pieces of identification information to the different processing sections.

25

(16)

The image processing system according to any one of (11) to (15), further comprising the pixel array section.

(17)

An image processing method using the image processing device according to any one of (1) to (9).

(18)

An image processing system including the image processing device according to any one of (1) to (9).

REFERENCE SIGNS LIST

1 IMAGING SYSTEM
10 IMAGING ELEMENT
10A GENERATING SECTION
10B OBTAINING SECTION
10C SETTING SECTION
10D OUTPUT SECTION
10E IMAGE SIGNAL PROCESSING SECTION
11 PIXEL ARRAY SECTION
11a PIXEL
12 VERTICAL DRIVING SECTION
13 COLUMN PROCESSING SECTION
14 HORIZONTAL DRIVING SECTION
15 SYSTEM CONTROL SECTION
16 PIXEL DRIVING LINE
17 VERTICAL SIGNAL LINE
18 SIGNAL PROCESSING SECTION
19 DATA STORAGE SECTION
20 SERIALIZER
30 IMAGE SIGNAL PROCESSING SECTION
31 DESERIALIZER
32 CV PROCESSOR
33 HV PROCESSOR
34 PROCESSOR
300 IMAGING DEVICE
301 OPTICAL SYSTEM
302 SHUTTER DEVICE
303 IMAGING ELEMENT
304 CONTROL CIRCUIT
305 SIGNAL PROCESSING CIRCUIT
306 MONITOR
307 MEMORY

The invention claimed is:

1. An image processing device comprising:

a memory storing a program, and at least one processor configured to execute the program to perform operations comprising:

sequentially obtaining a plurality of images based on pixel signals respectively output for a plurality of pixels in a pixel array;

assigning same identification information to those of the plurality of images having a same imaging condition and assigning different pieces of identification information to those of the plurality of images having different imaging conditions;

outputting the plurality of images to which the identification information is assigned;

assigning first identification information to the plurality of images in which the imaging condition is a condition for obtaining an image for computer vision; and assigning second identification information different from the first identification information to the plurality of images in which the imaging condition is a condition for obtaining an image for human vision.

2. The image processing device according to claim 1, wherein the identification information is data of Virtual Channel (VC) in a mobile industry processor interface (MIPI) standard.

3. The image processing device according to claim 1, wherein the condition for obtaining the image for computer vision is a condition that the image for computer vision becomes an image suitable for sensing via detection by a sensor, and the condition for obtaining the image for human vision is a condition that the image for human vision becomes an image suitable for viewing by a person.

4. The image processing device according to claim 1, wherein the condition for obtaining the image for computer vision is a condition that automatic exposure control for automatically controlling exposure related to imaging is off, and the condition for obtaining the image for human vision is a condition that the automatic exposure control is on.

5. The image processing device according to claim 1, wherein the condition for obtaining the image for computer vision is a condition that the image for computer vision is darker than the image for human vision.

6. The image processing device according to claim 1, wherein the operations further comprise:

associating imaging condition information related to the imaging condition with each of the plurality of images to which the identification information is assigned; and outputting a plurality of pieces of the imaging condition information together with the plurality of images to which the identification information is assigned.

7. The image processing device according to claim 6, wherein the operations further comprise:

respectively adding the plurality of pieces of imaging condition information as additional information to the plurality of images to which the identification information is assigned.

8. The image processing device according to claim 6, wherein each of the plurality of pieces of imaging condition information is data of Embedded Data (ED) in a mobile industry processor interface (MIPI) standard.

9. An image processing method comprising:

sequentially obtaining a plurality of images based on pixel signals respectively for pixel signals output from a pixel array a plurality of pixels;

assigning same identification information to those of the plurality of images having a same imaging condition;

assigning different pieces of identification information to those of the plurality of images having different imaging conditions;

outputting the plurality of images to which the identification information is assigned;

assigning first identification information to the plurality of images in which the imaging condition is a condition for obtaining an image for computer vision; and assigning second identification information different from the first identification information to the plurality of images in which the imaging condition is a condition for obtaining an image for human vision.

10. The image processing method according to claim 9, wherein the identification information is data of Virtual Channel (VC) in a mobile industry processor interface (MIPI) standard.

11. A non-transitory computer readable medium storing a program, the program being executable by a processor to perform operations comprising:

sequentially obtaining a plurality of images based on pixel signals respectively for pixel signals output from a pixel array a plurality of pixels;

assigning same identification information to those of the plurality of images having a same imaging condition;

assigning different pieces of identification information to those of the plurality of images having different imaging conditions;

outputting the plurality of images to which the identification information is assigned;

assigning first identification information to the plurality of images in which the imaging condition is a condition for obtaining an image for computer vision; and assigning second identification information different from the first identification information to the plurality of images in which the imaging condition is a condition for obtaining an image for human vision.

12. The non-transitory computer readable medium according to claim 11, wherein the identification information is data of Virtual Channel (VC) in a mobile industry processor interface (MIPI) standard.

13. The non-transitory computer readable medium according to claim 11, wherein the condition for obtaining the image for computer vision is a condition that the image for computer vision becomes an image suitable for sensing via detection by a sensor, and the condition for obtaining the image for human vision is a condition that the image for human vision becomes an image suitable for viewing by a person.

14. The non-transitory computer readable medium according to claim 11, wherein the condition for obtaining the image for computer vision is a condition that automatic exposure control for automatically controlling exposure related to imaging is off, and the condition for obtaining the image for human vision is a condition that the automatic exposure control is on.

15. The non-transitory computer readable medium according to claim 11, wherein the condition for obtaining the image for computer vision is a condition that the image for computer vision is darker than the image for human vision.

16. The non-transitory computer readable medium according to claim 11, wherein the operations further comprise:

associating imaging condition information related to the imaging condition with each of the plurality of images to which the identification information is assigned; and outputting a plurality of pieces of the imaging condition information together with the plurality of images to which the identification information is assigned.

17. The non-transitory computer readable medium according to claim 16, wherein the operations further comprise:

respectively adding the plurality of pieces of imaging condition information as additional information to the plurality of images to which the identification information is assigned.

18. The non-transitory computer readable medium according to claim 16, wherein each of the plurality of pieces of imaging condition information is data of Embedded Data (ED) in a mobile industry processor interface (MIPI) standard.

* * * * *